N. SPOFFORD.
Faucet-Joint.

No. 215,987. Patented May 27, 1879.

WITNESSES
Robert Everett
N. Clay Smith

INVENTOR.
Nelson Spofford,
By Gilmore, Smith & Co.
ATTORNEYS

UNITED STATES PATENT OFFICE.

NELSON SPOFFORD, OF HAVERHILL, MASSACHUSETTS.

IMPROVEMENT IN FAUCET-JOINTS.

Specification forming part of Letters Patent No. 215,987, dated May 27, 1879; application filed March 22, 1879.

*To all whom it may concern:*

Be it known that I, NELSON SPOFFORD, of Haverhill, in the county of Essex and State of Massachusetts, have invented certain new and useful Improvements in Faucet-Joints; and I do hereby declare that the following is a full, clear, and exact description of the construction and operation of the same, reference being had to the annexed drawings, making a part of this specification, and to the letters and figures of reference marked thereon.

Figure 1:
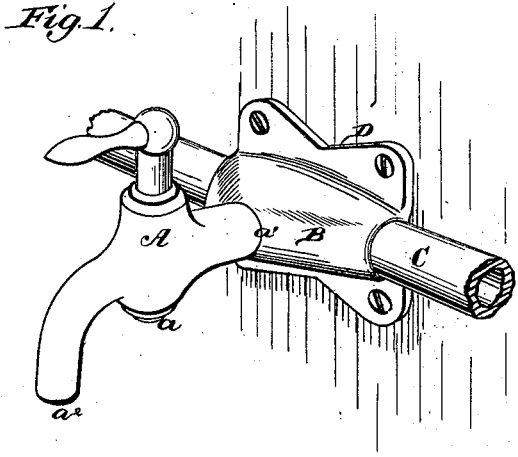
Figure 2:
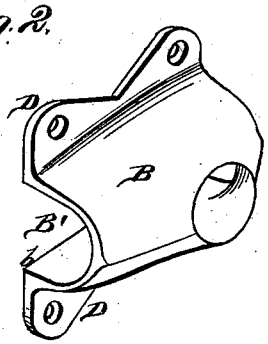

Figure 1 of the drawings is a representation of a perspective of my faucet-joint, and Fig. 2 is a perspective detail view of the same.

My invention relates to a faucet-connection with water-pipes and the like, and is particularly adapted to water-pipes in buildings, halls, &c., whether horizontal or vertical; and the novelty consists in the construction and arrangement of parts, as will be more fully hereinafter set forth.

The invention may be applied to any pipes where a lateral connection leading to the interior of the pipe is desired without departing from the principle of my invention.

As heretofore practiced, the faucet tapered toward the junction with the service-pipe, and at such junction a large amount of solder was employed to make a proper joint, superfluous solder being "wiped" off with a cloth, requiring the services of a skilled workman. By my invention I dispense with this wipe-joint, and make a substantial and efficient joint between the faucet and the service-pipe by the means and process which will be hereinafter more specifically described.

In carrying out my invention I employ a joint-piece of metal having a longitudinal groove or semi-cylindrical recess, which receives the service-pipe, and a transverse circular aperture to receive the faucet. The longitudinal flanges which form the recess extend beyond the circumference of the pipe, and being bent outward form perforated ears, by means of which the whole may be secured to the wall, joists, or other desired place by screws, bolts, or the like.

The joint-piece is secured to the faucet, as shown.

In applying the device to make connection with a water-pipe, for instance, an ordinary workman with solder could readily make a neat joint at little cost.

Referring to the drawings, A represents an ordinary faucet or stop-cock, having valve $a$, inlet $a^1$, and outlet $a^2$. The inlet end $a^1$ is made in one with it, or secured to it by a proper joint. A flaring joint-piece, B, having a circular aperture to receive the faucet, and which forms a groove or semicircular recess, B', which receives the water-pipe C, to which it is soldered, is provided with perforated ears D, as shown, to allow of the whole being secured to the wall, &c.

The form of the joint-piece may be varied without departing from the principle of my invention.

What I claim as new, and desire to secure by Letters Patent, is—

A faucet-joint, B, for securing faucets to service-pipes, provided with a semi-cylindrical recess, B', to receive such pipe, perforated ears D, to secure the joint to the wall, and transverse circular aperture to receive the faucet, substantially as and for the purposes set forth.

In testimony that I claim the above I have hereunto subscribed my name in the presence of two witnesses.

N. SPOFFORD.

Witnesses:
JOHN S. SPOFFORD,
JOHN T. DESMOND.